United States Patent [19]
Homayoun

[11] Patent Number: 5,940,471
[45] Date of Patent: Aug. 17, 1999

[54] METHOD AND APPARATUS FOR OBTAINING FEEDBACK REGARDING NETWORK SERVICES

[75] Inventor: Fereidoun Homayoun, Plano, Tex.

[73] Assignee: Northern Telecom Limited, Quebec, Canada

[21] Appl. No.: 08/720,883

[22] Filed: Oct. 4, 1996

[51] Int. Cl.[6] .............................. H04M 1/34; H04M 15/00
[52] U.S. Cl. ................................ 379/1; 379/34; 379/112; 379/21; 379/9; 379/10; 455/67.1; 455/423; 455/424
[58] Field of Search ...................................... 455/437, 438, 455/439, 67.1, 67.7, 424, 423; 379/1, 2, 6, 12, 22, 26, 27, 28, 34, 19, 23, 24, 21, 25, 29, 32

[56] References Cited

U.S. PATENT DOCUMENTS

| | | | |
|---|---|---|---|
| 4,670,898 | 6/1987 | Pierce et al. ................................ | 379/22 |
| 4,764,949 | 8/1988 | Faith et al. .................................. | 379/22 |
| 5,008,953 | 4/1991 | Dahlin et al. ............................... | 455/33 |
| 5,095,500 | 3/1992 | Tayloe et al. ............................... | 379/32 |
| 5,216,702 | 6/1993 | Ramsden .................................... | 379/24 |
| 5,577,115 | 11/1996 | Deutsch et al. ........................... | 379/399 |
| 5,694,451 | 12/1997 | Arinell ........................................ | 379/34 |
| 5,706,333 | 1/1998 | Grenning et al. .......................... | 379/59 |
| 5,737,389 | 4/1998 | Allen ........................................... | 381/322 |
| 5,799,060 | 8/1998 | Kennedy et al. ........................... | 379/29 |
| 5,799,072 | 8/1998 | Vulcan et al. ............................. | 379/114 |
| 5,802,502 | 9/1998 | Gell et al. .................................. | 379/114 |

OTHER PUBLICATIONS

Document Number: XP-002064923 Dated: Oct. 25, 1992—Real-Time Quality Measure Telecommunication Call Alert Subscriber Call Select Sample Operate (C) WPI/Derwent AN—92-380730 c25.

Hladik W. M. et al: "Mechanizing The Customer Access To Network Trouble Reporting Operations" Sep. 11, 1998, Proceedings of the International Symposium on Subscriber Loops and Services (ISSLS), pp. 262–266.

*Primary Examiner*—Curtis A. Kuntz
*Assistant Examiner*—Rexford N. Barnie
*Attorney, Agent, or Firm*—John D. Crane

[57] ABSTRACT

A method and apparatus for obtaining real-time, call by call, feedback from customers as to their perceived quality of network services may be accomplished after a communication, via a network connection between a calling party and at least one called party, is completed. Upon completion, the network retains, for a predetermined period of time, at least a portion of the network connection to one of the parties involved in the communication. During this predetermined period of time, the party provides feedback in the form of a sequence of numbers entered which identify his or her perception of the quality of various aspects of the call. If the feedback is received within the predetermined period of time, the network compiles the data which can then be used to interpret the opinion of many individuals as to network service quality, information as to catastrophic failures as well as mild failures, overall service, the perceived quality of new services and features, and quality of internetworking. In addition, the compiled data may be used for future infrastructure planning, user behavior profiles, and inter exchange carrier quality.

4 Claims, 5 Drawing Sheets

LEVEL ONE RECORD (0-RESERVED FOR NO COMMENT)

| CALLING PARTY (92) | CALLED PARTIES (94) | QUALITY OF XMISSION (96) | SPEED AND ACCURACY OF CONNECT/DISCONNECT (98) | BLOCKING (100) | RELIABILITY OF CONNECTION (102) |
|---|---|---|---|---|---|
| PHONE NUMBER | PHONE NUMBER 1 | 1-9 | 1-9 | 1-9 | 1-9 |
|  | PHONE NUMBER 2 | 1-9 | 1-9 | 1-9 | 1-9 |

FIG. 5

LEVEL TWO RECORD

| CALLING PARTY (112) | CALLED PARTIES (114) | QUALITY OF XMISSION (116) | CALL SET-UP DELAY (118) | ECHO (120) | NOISE (122) | VOLUME (124) | OPERATOR RESPONSE (126) | DISTORTION (128) | DROP CALL (130) | VARY OF XMISSION (132) |
|---|---|---|---|---|---|---|---|---|---|---|
| PHONE NUMBER | PHONE NUMBER 1 | 1-9 | 1-9 | 1-9 | 1-9 | 1-9 | 1-9 | 1-9 | 1-9 | 1-9 |
|  | PHONE NUMBER 2 | 1-9 | 1-9 | 1-9 | 1-9 | 1-9 | 1-9 | 1-9 | 1-9 | 1-9 |
|  | ... | ... | ... | ... | ... | ... | ... | ... | ... | ... |
|  | PHONE NUMBER n | 1-9 | 1-9 | 1-9 | 1-9 | 1-9 | 1-9 | 1-9 | 1-9 | 1-9 |

| LOCATION | SERVICE | COMPILED RESPONSE |
|---|---|---|
| AREA NUMBER 1 (LEVEL 1) | XMISSION QUALITY | 3.7 |
| | CONNECT/ DISCONNECT SPEED AND ACCURACY | 8.3 |
| | RELIABILITY OF CONNECTION | 8.1 |
| AREA NUMBER 1 (LEVEL 2) | SET-UP DELAY | 8.1 |
| | ECHO | 3.2 |
| | NOISE | 8.7 |
| | VOLUME | 7.9 |
| | DISTORTION | 8.1 |
| | DROP CALL | 8.8 |
| | VARIATION OF XMISSION | 9.0 |

METHOD AND APPARATUS FOR OBTAINING FEEDBACK REGARDING NETWORK SERVICES

TECHNICAL FIELD OF INVENTION

This invention relates generally to telecommunications networks and more particularly to obtaining customer feedback as to the quality of telecommunication services.

BACKGROUND OF THE INVENTION

Telecommunications systems are known to include a plurality of phones, a plurality of Local Exchange Carriers (LEC) and/or a plurality of Private Branch Exchanges (PBX), and a plurality of Inter-Exchange Carriers (IEC). Each of the plurality of phones is coupled to either an LEC or a PBX and each of the LECs and PBXs are coupled to at least one IEC, where the IEC provides a network connection between LECs and/or PBXs. As is generally known, long distance service providers operate the IECs, independent businesses operate the PBXs, and local telephone companies operate the LECs. Recent legislative events in the United States, however, have allowed LEC operators and IEC operators to enter into each others area of expertise.

To enable a calling party to communicate with a called party, a network connection must be established. Generally, the calling party initiates a network connection by entering the called party's phone number. The called party's phone number is routed to the calling party's LEC (or PBX if the calling party is coupled to a PBX instead of an LEC) which, in turn, interprets the phone number to determine if the dialed number is indicating a local call or a long distance call. As is known, the determination of a long distant call is made when the LEC detects a long distance prefix of a "1" followed by an appropriate area code; absent the long distance prefix, the LEC determines that the number dialed is for a local call. If the LEC determines that the number dialed is for a local call (i.e., the called party is coupled to the same LEC as the calling party), it completes the network connection to the called party. Thereafter, the called party and calling party participate in a communication until terminated.

If, however, the number dialed is for a long distance call, the LEC routes the call to an IEC. The IEC interprets the telephone number and routes it either to another IEC, a PBX, or a LEC. Depending on the geographic distance between the calling party and the called party, the network connection may be through several IECs before reaching the PBX or LEC of the called party. When the network connection is finally made with the LEC of the called party, the LEC rings the called party, thus enabling the parties to communicate.

As an alternative to establishing the network connection through an IEC, the LEC of the calling party may route the call to another LEC which then completes the network connection to the called party. Once the network connection between the called party and calling party is established, the called party's telephone rings. The network connection remains until one of the parties terminates the call by hanging up the telephone.

Over the last 15 years, the telecommunications industry has dramatically changed. Prior to this change, telecommunications typically supported voice communications over wireline to wireline connections. Today, data, digitized voice, digitized video, and multi-media are being communicated over wireline, wireless, cable, satellite links, and Internet mediums.

In addition to the dramatic changes in the telecommunications system infrastructure, the services being provided by network providers has also dramatically changed. Such changes include 800 and 900 calls, large conference calls via bridges, video-conference calls, data networking, facsimile transmissions, and many other data and multi-media services.

As a result of the increase in telecommunications services and infrastructures, competition has dramatically increased. To distinguish one self from its competition, a network service provider spends millions of dollars advertising its particular services and the quality of its network connections. In essence, each network provider is trying to distinguish itself in reference to its network performance and the services available for its customers.

While many network providers test their equipment for acceptable performance levels, they receive little, if any, feedback from customers as to the customers' perceived quality of service. If a customer does provide feedback, it is usually after a catastrophe happens to his or her service. For example, a customer may be blocked from placing a telephone call for a significant period of time, have an existing communication terminated for an unexplained reason, or a communication that has such poor quality that the parties cannot hear one another. Further, this information is usually provided several hours or even days after the incident happen. Still further, this information may be generalized based on a number of calls in which the unsatisfactory service occurred.

Thus, network providers are getting little if any feedback as to the customers' perception of quality and what they do get is usually generalized information that is hours or even days after the fact. Such sporadic and generalized customer feedback has limited usefullness in determining future planning, the perceived quality of new services and features, user behavior profiles, inter exchange carrier perceived quality, diagnostic information as to catastrophic failures as well as mild failures, overall general service, and quality of inter-networking.

Therefore, a need exists for a method and apparatus that allows a network provider to obtain real-time information from a customer on a call by call basis regarding the customer's perception of network services.

SUMMARY OF THE INVENTION

This invention comprises a method and apparatus for obtaining real-time, call by call, feedback from customers as to their perceived quality of network service. Upon completion of a network connection between a calling party and at least one called party, the network retains, for a predetermined period of time, at least a portion of the network connection to one of the parties involved in the communication. During this predetermined period of time, the party provides feedback in the form of a predefined sequence of numbers entered which correspond to his or her perception of the quality of various aspects of the telecommunication service just completed. If the feedback is received within the pre-determined period of time, the network compiles the data which can then be used to express the opinion of many individuals as to network service quality, information as to catastrophic failures as well as mild failures, overall service, the perceived quality of new services and features, and quality of inter-networking. In addition, the compiled data may be used for future infrastructure planning, user behavior profiles, and inter exchange carrier quality measurement.

DETAILED DESCRIPTION OF A PREFERRED EMBODIMENT

Generally, the present invention provides a method and apparatus for obtaining real-time, call by call, feedback from customers as to their perceived quality of network services. This may be accomplished once a communication has been established via a network connection between a calling party and at least one called party. Upon completion of the communication, i.e. one of the parties have hung up their terminal, the network retains, for a predetermined period of time, at least a portion of the network connection to one of the parties involved in the communication. During this predetermined period of time, the party provides feedback as to his or her perception of the quality of various aspects of the call. If the feedback is received within the predetermined period of time, the network compiles the data which can then be used to interpret the network service quality, diagnostic information as to catastrophic failures as well as mild failures, overall general service, the perceived quality of new services and features, and quality of inter-networking (networking i.e. networking mismatches and poor engineering). In addition, the compiled data may be used for future infrastructure planning, user behavior profiles, and inter exchange carrier quality. With such a method and apparatus, the present invention allows network providers to obtain real time feedback on a call by call basis as to the perceived quality of their services thereby enabling the network provider to further distinguish itself from its competitors.

Figure 1:
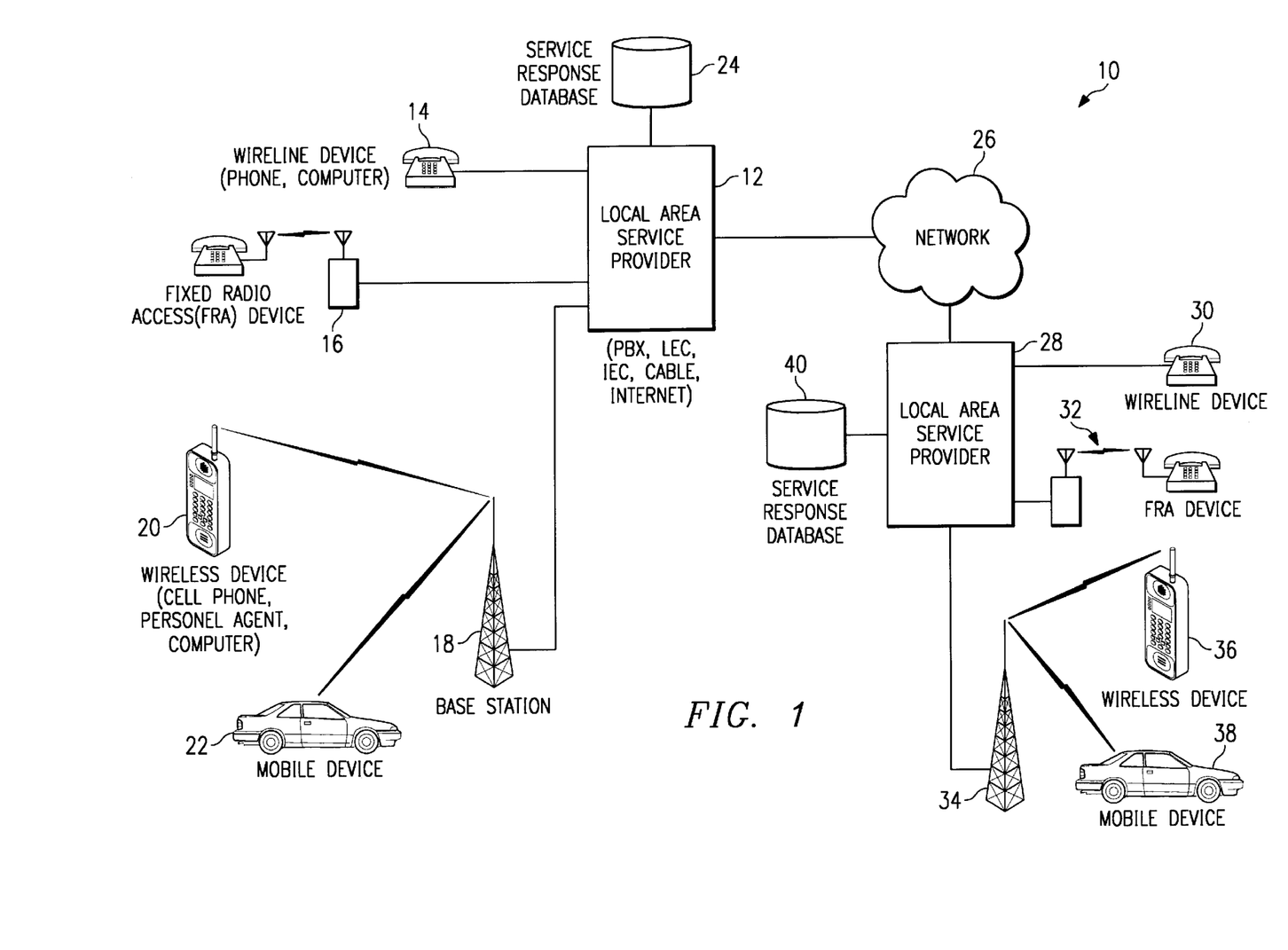
FIG. 1 illustrates a schematic block diagram of a telecommunications system in which the present invention may be incorporated.

The present invention is more fully described with reference to FIGS. 1 through 9. FIG. 1 illustrates an end-to-end telecommunications network 10 i.e., a network which includes connections between two telecommunication devices such as a wireline device, a fixed radio device or a wireless device. The telecommunications network 10 includes two local area service providers 12, 28 coupled to a network 26. The network 26 may be, but is not limited to, a local exchange carrier (LEC), an inter-exchange carrier (IEC), cable infrastructure, satellite infrastructure, Internet infrastructure, wireless infrastructure, or any combination thereof.

The local area service providers 12, 28 may be, but is not limited to, a private branch exchange (PBX), an LEC, an IEC, a local cable company, a local Internet provider, a wireless communications provider, or a satellite communications provider that provides services directly to communication device users. The local area service providers 12, 28 are respectively coupled to a plurality of communication devices such as a wireline device 14, 30 (which may comprise an ordinary telephone, a computer, or a facsimile machine), a fixed radio access (FRA) device 16, 32, or a wireless base station 18, 34. The wireless base station 18, 34 provides wireless communications to wireless communications devices 20 36 or mobile wireless devices 22, 38. As is known, a wireless device 20 may be a cellular phone, personal agent, or a computer having a wireless modem. The mobile device 22, 38 may be a cellular telephone mounted within a automobile, a personal agent within the automobile, or a computer having a wireless modem within the automobile.

The local area service providers 12, 28 are each respectively coupled to a service response database 24, 40. The service response databases 24, 40 compile the feedback responses as to customers' perceived quality of the network services as inputted on a call-by-call basis. The compilations that each service response database 24,40 performs for its associated local area service provider 12, 28 may be bundled for sale or license to other local area service providers. In addition, the compiled data may be used to obtain information regarding future planning, perceived quality of new services and features, obtain a profile of user behavior, determine which partnering exchange carriers offer better quality as perceived by the customer, obtain diagnostic information as to catastrophic failures as well as mild failures, obtain diagnostic information, improve overall service, and offer better inter-networking. As will be appreciated by one skilled in the art, the customer feedback may be received from any or all the wireline devices 14, 30, the FRA devices 16, 32, the wireless device 20, 36, or the mobile devices 22, 38 in the network.

The feedback responses from the operators of any of the communications device 14, 16, 20, 22,30, 32,36, or 38 may range from a simple single input as to the overall perceived quality or to a very detailed multi input response. For example, the network service provider could establish two levels of feedback. The first level of feedback could be for a minimum number of inputs or questions. For example, the operators of the communication devices could be asked to respond to their perception as to the quality of transmission, speed and accuracy of connection and disconnection, blocking, and reliability of connection. For these responses, the user could input a number via the key pad, ranging from 1–9, for example, where 1 represents poor quality and 9 represents very high quality. Other ranges of numbers could be specified as answers to each question. If the respondent has no comment regarding this input, they could enter a 0. Having inputted his or her responses, the operator of the communication device may either enter a end of response signal, such as pressing the pound (#) sign, or simply hang up.

The second level of feedback response, may ask the user to input the answer to several more questions as the quality of the communication. For example, the user may be asked to respond to the set up delay, echo heard on the line, noise on the line, the volume, any distortion, whether the call has been dropped, and variations in transmission. As with the first level, the operator may use his or her keypad to enter a response of 1–9 to each question or a "0" if the operator has no comment.

To encourage operators of communication devices to provide the feedback responses, a local area service provider may offer service discounts each time a complete response is received. For example, for the first level, the communication device operator may receive a five percent discount on each network access that the operator provides feedback, while operators providing second level responses may receive a greater discount. As one skilled in the art will readily appreciate, the local area service provider must have some mechanism for identifying which of its customers will be providing level one and level two feedback responses. Such mechanisms may include, but no limited to, customer subscriptions, contracts for level two responses, or assume that all customers will provide responses.

Upon receiving the feedback responses, the service response databases 24, 40 interpret the data to determine the perceived quality of the transmission on a call-by-call basis. For example, if the data being provided from a given geographic area identifies a catastrophic problem within the network, the local area service provider can respond within minutes to restore service. Alternatively, the data may indicate degradation in service at certain times of the day, thereby providing information that the network may need additional resources to handle these peak times. As mentioned above, depending on what information the local area service provider is seeking, the complied data may be used to obtain information regarding future planning, perceived quality of new services and features, obtain a profile of user behavior, determine which partnering exchange carriers offer better quality as perceived by the customer, obtain diagnostic information as to catastrophic failures as well as mild failures, obtain diagnostic information, improve overall general service, and offer better inter-networking.

Figure 2:
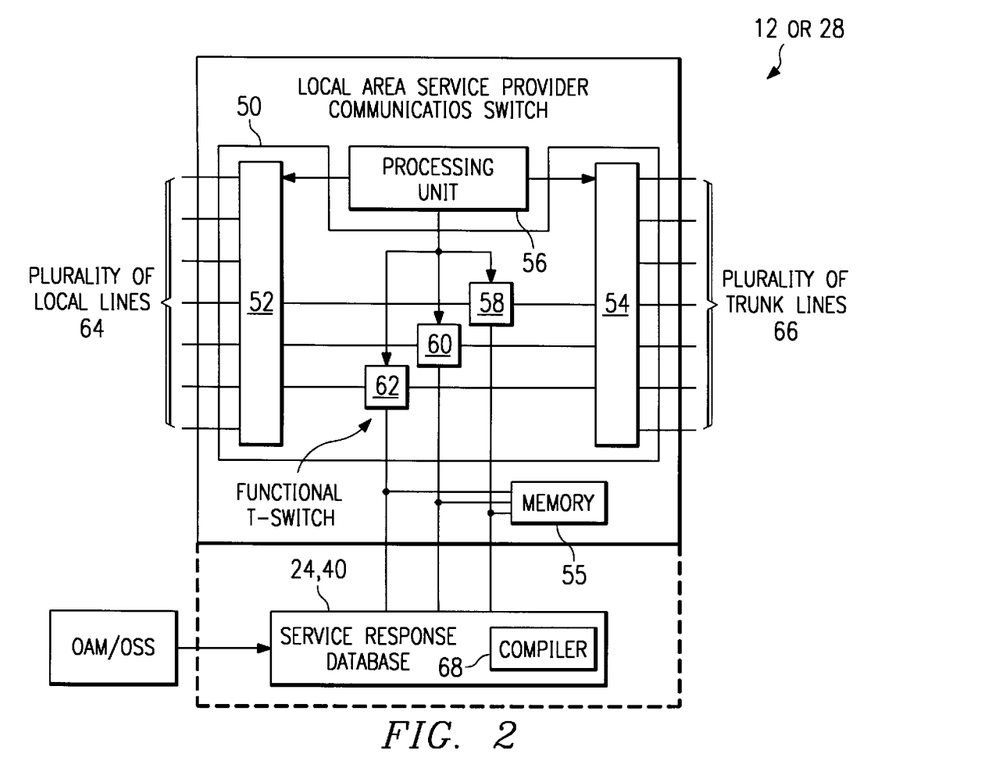
FIG. 2 illustrates a schematic block diagram of a local area service provider of FIG. 1.

FIG. 2 illustrates a schematic block diagram of a local area service provider such as 12 or 28 containing only those components germane to the discussion of the present invention. As shown, each local area service provider 12 or 28 includes a communication switch 50, a processing unit 56, and memory 55. The communication switch 50 includes a line interface 52 which couples a plurality of local lines 64 to the local area service provider and a trunk interface 54 which couples a plurality of trunk lines 66 to the local area service provider. As is generally known, the plurality of local lines 64 couple the local area service provider to the wireline devices 14, 30, the FRA device 16, 32, and the base stations 18, 34. The plurality of trunk lines couple the local area service provider to other local area service providers or the network 26. In addition to the interfaces 52 and 54, the communication switch 50 includes a plurality of functional T switches such as switches 58, 60, and 62. The functional T switches may be physical T switches, or electronic bridges. In either case, the functional T switches 58, 60, and 62 are controlled by the processing unit 56 to connect one of the local lines 64 to one of the trunk lines 66 to form a connection there between. When a communication being supported by the network connection is terminated, the processing unit 56 controls the functional T switch to coupled the local line 64 to either the memory 55 or the service response database 24 40.

For a local call, the processing unit 56 controls a T switch to connect one of the local lines to another one of the local lines thereby establishing the network connection. At the termination of the local call, the processing unit 56 controls the T switch to connect one or both of the local lines to either the memory 55 or to the service response database 24 40. The processing unit 56 determines when a local or long distance call has been terminated by detecting either a special input indicating termination of the call and entering feedback mode (E.g. the star (*) button is depressed) or a normal termination process (E.g. the parties hang up their phones).

Each local area service provider 12 or 28 includes respectively a service response database 24, 40 which in turn includes a compiler 68. Note that the service response database 24 40 is shown as dotted line coupled to the local area service provider indicating that the service response database 24 40 may be an integral component of the local area service provider or a separate component. As a separate component, the service response database 24 40 could be operated by the operator of the local area service provider or an independent operator. Also note that the real-time feedback responses could be directly routed to the service response database or buffered in memory 55. If the responses are buffered, the data would be relayed to the service response database when polled by the compiler 68. Regardless of how the data is received by the service response database, the compiler 68 interprets the data to provide the desired service information. This data, coupled with other data/information received from an operating support system, will provide both call by call as well as typical OAM trouble reports. Correlation of these two sets of information will provide more information that current OAM data alone.

Figure 3:
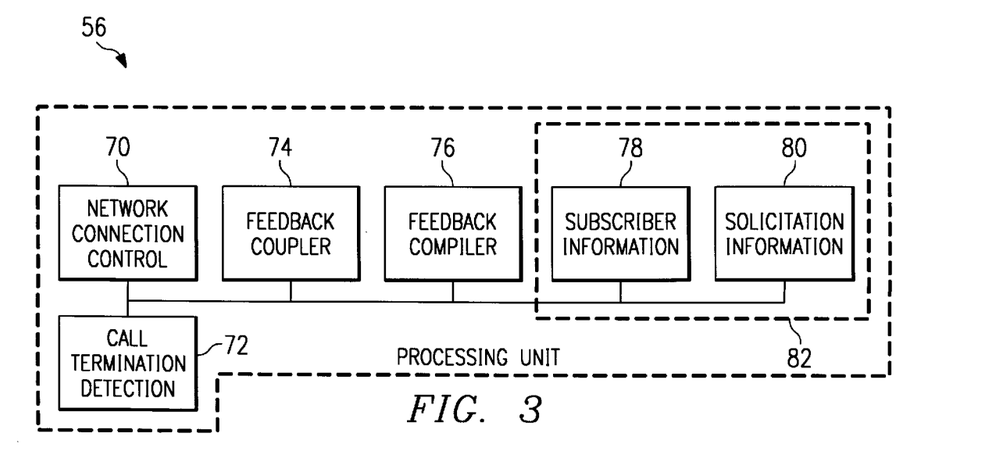
FIG. 3 illustrates a schematic block diagram of a processing unit of the local area service provider of FIG. 2.

FIG. 3 illustrates a schematic block diagram of the processing unit 56 which may be a personal computer, a workstation, a plurality of microprocessor, a plurality of microcontrollers, an individual microprocessor or individual microcontroller or any other device that, based on input instructions, can manipulate digital data in a given way. As shown, the processing unit 56 includes a network connection controller section 70, a call determination detection section 72, a feedback coupler section 74, a feedback compiler section 76, and memory 82 which includes subscriber information section 78 and solicitation information 80. The sections of the processing unit 56 may be separate coprocessors, program instructions implemented by the processing unit, or a combination thereof.

In operation, the network connection control section 70 coordinates the coupling of local lines to trunk lines for long distance calls and local lines to local lines for local calls via the T switches. Such a connection is well known in the art thus no further discussion will be provided except to facilitate the understanding of the present invention. The call termination detection section 72 determines when the calling party and at least one called party have ended their communication. This may be determined either by detecting that one or both of the parties have hung up their phone, or receiving from one of the parties a special termination code. For example, the special termination code, as mentioned above, may be the star (*) button.

Upon detecting the termination, the feedback coupler section 74 controls the functional T switch to couple the local line to the service response database and monitors the local line for an indication that the communication device has provided a feedback response before expiration of a pre-determined period of time. An indication may be detecting the actual feedback response or a special code (E.g. the # button) indicating that the communication device has ended the feedback mode. The feedback coupler 74 controls the T switch to disconnect the local line when feedback has been provided or when the pre-determined period of time expires.

In addition to the T-switch disconnecting the local line, the feedback compiler section 76 routes the feedback response to either the memory 55 or the service response database 24, 40. The feedback compiler section 76 may also check the feedback response to verify that it is complete before sending it to the memory 55 or to the service response database. Verification may be accomplished by simply counting the number of digits within the feedback response.

For example, if the response is a level one response, the response would contain three digits followed by the # sign. If the # sign is received before three digits were received, the feedback compiler section 76 indicates that the data is incomplete and does not forward it. A similar verification process may be used for level two responses.

The subscriber information section 78 of the memory 82 stores information related to the called party and/or the calling party. Such information would indicate whether the party has subscribed to a feedback discount and to what level of feedback it will provide. If a party is not listed, the feedback coupler section 74 and compiler section 76 will not be activated for this party. As mentioned, the network service provider may provide a customer lower service rates or some other incentive in exchange for their feedback responses. The solicitation information section 82 stores information that may be utilized by the local area service provider to prompt subscribers as to what feedback is needed, to prompt them that they should be providing feedback, and to indicate their accrued savings as a result of providing the feedback.

Figure 4:
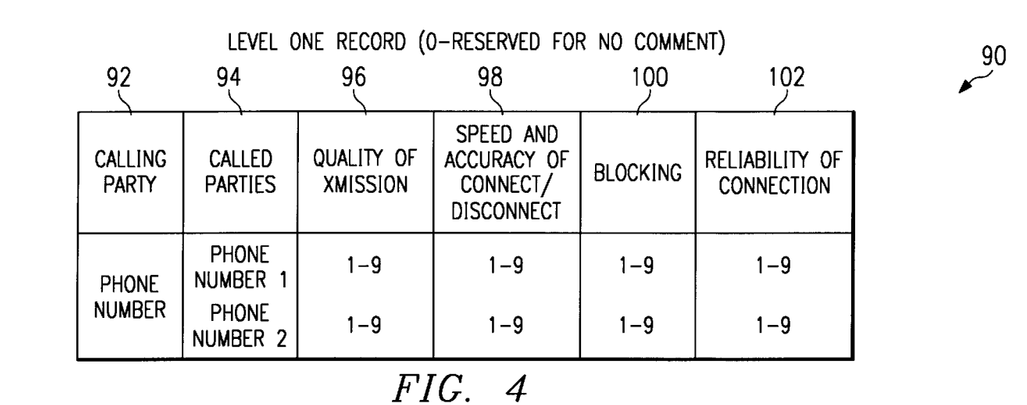
FIG. 4 illustrates a feedback response record in accordance with the present invention.

FIG. 4 illustrates a level 1 feedback response record 90 from a customer. As shown, a level 1 record includes a field for the calling parties phone number 92 and a field for the called parties phone number 94, which fields will be automatically updated by the network. The record also includes a field for the feedback response indicating quality of transmission 96, a field for a feedback response related to the speed and accuracy of connection and disconnection 98, a field for the response to blocking 100, and a field for a response to reliability of connection 102. While not shown in FIG. 4, each individual respond by a called party or a calling party will be time stamped. The time stamping may be done by the processing unit 56.

A party may respond via their key pad, key board, or other data entry means associated with its communication device. Such inputs may range from 1–9, where an input of 1 indicates low satisfaction with the particular service, while a 9 indicates a very high satisfaction of the particular service. It is contemplated that the number 0 will be reserved for no comment regarding this particular feature. For example, if the operator of the communications device is asked to provide responses as to the quality of transmission, the speed and accuracy of connection and disconnection, blocking, and reliability of connection, the operator may simply enter in a sequence of four digits representing its selection as to its perceived quality. In addition, the operator may also enter a specialized code, i.e. such as the pound (#) sign, to indicate that all data has been inputted. Alternative, the specialized code may be sent prior to all four digits being entered, indicating that the customer desires to exist the feedback mode without providing a response. One skilled in the art will readily appreciate that other symbols, digits, characters, voice recognition, graphic user interface (GUI), etc. may be used by the customer to indicate its feedback responses.

The questions, that the operator of the communications device is asked, may actually be stated by a transcribed voice, a synthesized voice or the like during the predefined period following the termination of the communication. Alternatively, the operator of the communications device will be advised of the format of the data to be entered and a sequence of numbers can be entered to match that format. In either approach, however, the numbers entered represent the operator of the communications device's perception as to quality of different aspects of the communication just completed.

Figure 5:
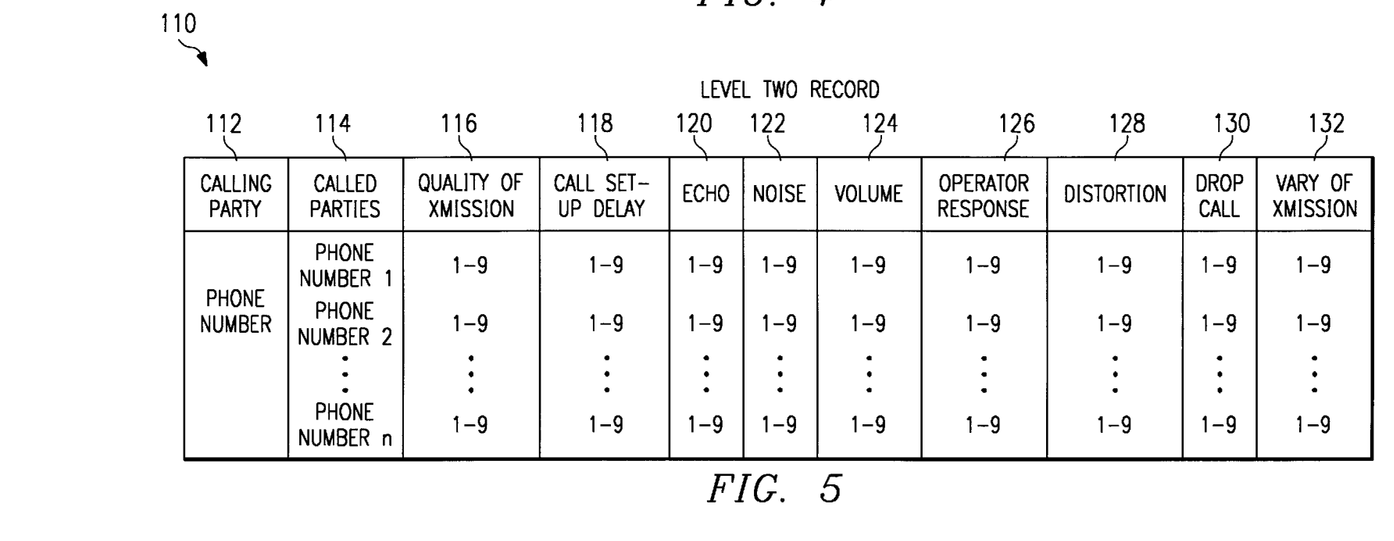
FIG. 5 illustrates an alternative feedback response record in accordance with the present invention.

FIG. 5 illustrates a level 2 record 110 which includes, but not limited to, fields for the calling party's phone number 112, the called parties' phone number 114, quality of transmission 116, call setup delay 118, echo 120, noise 122, volume 124, operator response 126, distortion 128, drop call 130 and variation of transmission quality 132. As with the level 1 record, the respondents are asked to provide, for each category, a response in the range of 1–9 regarding their satisfaction of the particular service. As indicated by FIGS. 4 and 5, a feedback response may be provided by any or all of the calling party and the called parties. Note that feedback could be provided for any type of communication that could take place over a network connection. For example, the communication may be a teleconference call between multiple parties, a video conference, a one-to-one voice call, data transmission, or multi-media transmission. As is known, a teleconference may be established by a calling party conferencing in the called parties or all the parties dialed into a bridge which establishes the teleconference call. Also note that the particular fields of FIGS. 4 and 5 are representative of the feedback that could be requested and does not represent an exhaustive list. As one skilled in the art will readily appreciate, the operator of a communication device may provide feedback as to any number factors that impact network quality.

Figures 6, 7:
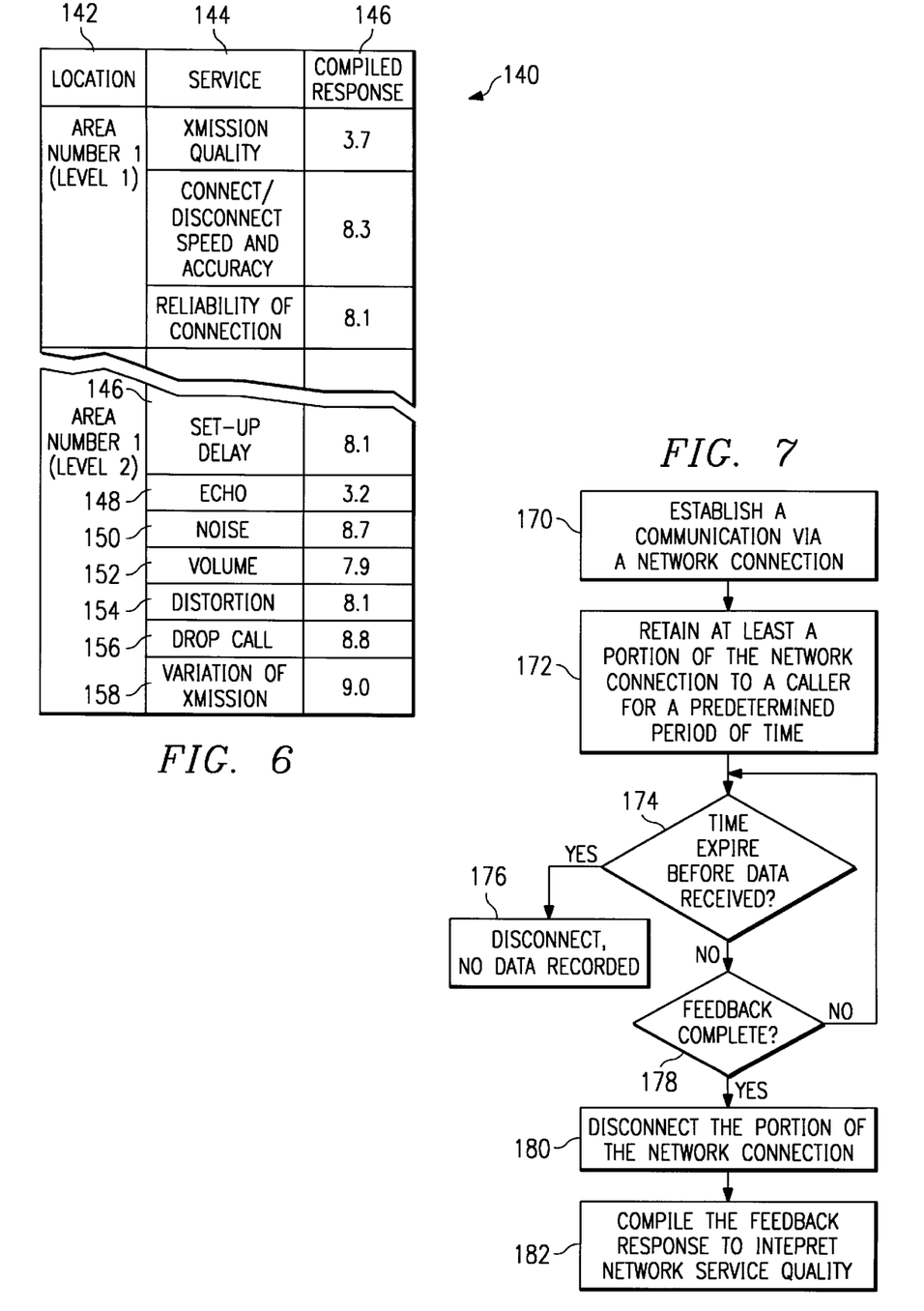
FIG. 6 illustrates a compiled feedback record in accordance with the present invention.
FIG. 7 illustrates a logic diagram that may be used to implement the present invention.

FIG. 6 illustrates a compilation record 140 that includes a field for the geographic location of interest 142, the particular service 144, and the compiled response 146. As shown, the location is in the first column and the data is compiled based on level 1 responses (see FIG. 4) and level 2 responses (see FIG. 5) are in columns 2 and 3. The particular area designated referenced by the location may be as broad as the entire area serviced by the local area service provider, or as small as an individual user. As shown, the level 1 compiled information shows that the transmission quality is 3.7, while the disconnect speed and accuracy responses is 8.3 and the reliability connection is 8.1. From this compilation, the network provider can see that, for a given period of time and in the designated area, the customers are satisfied with the connect and disconnect speed and accuracy and the reliability of connection but are somewhat dissatisfied with the quality of transmission. This will be correlated with the data from an OSS to find the root cause of a problem, if any.

The compiled level 2 data shows that the set up delay 146 has a compiled response of 8.1, echo 148 has a compiled response of 3.2, noise 150 has a compiled response of 8.7, volume 152 has a compiled responses of 7.9, distortion 154 has a compiled response of 8.1, drop call 156 has a compiled response of 8.8 and variation of transmission 154 has a compiled response of 9.0. From the compiled level 2 data, the users are satisfied with all types of quality except for echo 148. Thus, the local area, or network, service provider can infer that the reason the level 1 data indicates a dissatisfaction with the quality of transmission is due to echo in the lines and can take corrective action. Note that the compiled data of FIG. 6 is for a given period of time that may be in the range of a few minutes to several hours.

FIG. 7 illustrates a logic diagram that represents a method for obtaining feedback responses from communication device operators. The process begins at step 170 where a network establishes a communication between a calling party and at least one called party via a network connection. As previously mentioned, the network connection may be local within a PBX or LEC, or may be long distance through a plurality of PBX's, LEC's and/or IEC's and further via wireline, wireless, Internet, cable, or satellite links.

Once the communication has been terminated, the network retains at least a portion of the network connection to a party for a pre-determined period of time. The portion maintained may be from the communication device to the PBX or LEC, while the pre-determined period of time may vary from a few seconds to a few tens of seconds. Having initiated the pre-determined of time, the network determines whether it has received a feedback response from the communication device at step 172. If the time expires before a response is received, the process proceeds to step 176 where the portion of the network connection is terminated and no data is recorded.

If, however, the time has not expired, the network determines whether an end-of-feedback signal has been received. As previously mentioned, the end-of-feedback signal may be the pound (#) sign on the telephone. This is determined at step 178. If the time has not expired and a feedback complete signal has not yet been received, the process waits either for the time to expire or feedback to be received. If a feedback response is received, the process proceeds to step 180 where the retained portion of the network connection is disconnected. Having done this, the process proceeds to step 182 where the feedback responses are compiled to interpret network service quality.

Figure 8:
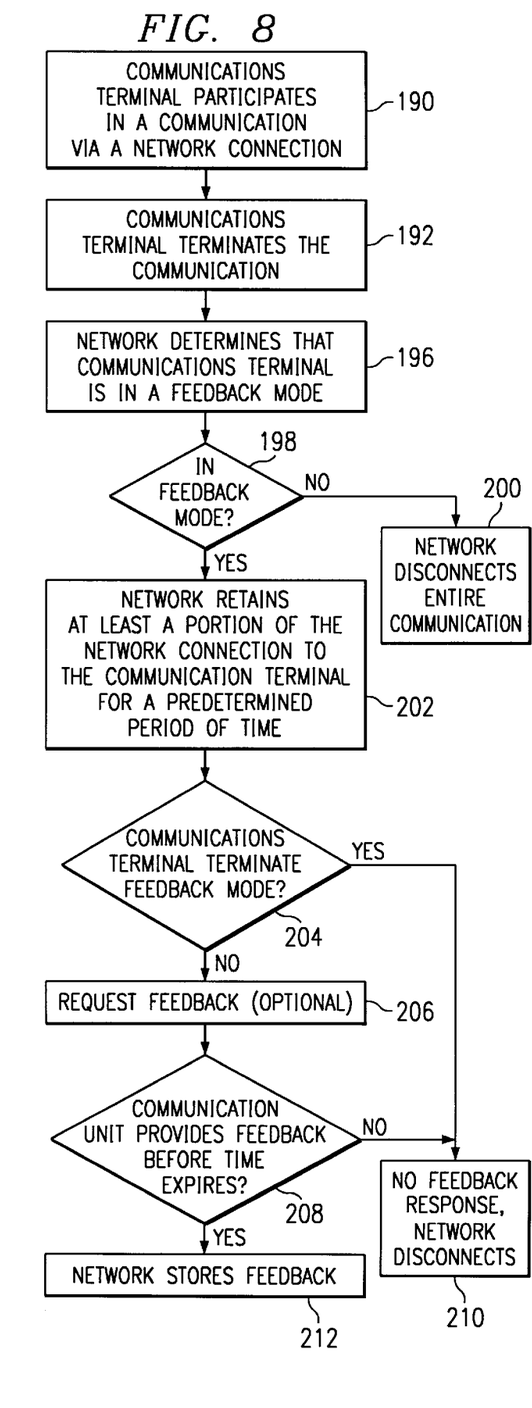
FIG. 8 illustrates an alternative logic diagram that may be used to implement the present invention.

FIG. 8 illustrates an alternate logic diagram for obtaining feedback responses from communication device operators as to their perceived quality of network services. The process begins at step 190 where a communications terminal, or device, participates in a communication via a network connection. The process proceeds to step 192 where the communication is terminated by the communications terminal. As previously mentioned, a communications terminal may terminate a communication by hanging up the phone, i.e. performing a normal termination, or executing a special code such as a star (*) sign. The process proceeds to step 196 where the network determines whether a communication terminal is in a feedback mode. This may be determined by either receiving the special code, i.e. star (*), or detecting that the communication terminal has re-initiated a normal communication i.e. picked up the receiver of the phone, within the predetermined period of time.

At step 198, if the communications terminal is not in the feedback mode the network disconnects the entire network connection at step 200. If, however, the communications terminal is in the feedback mode, the process proceeds to step 202 and the network retains at least a portion of the network connection to the communication terminal for a pre-determined period of time. Having done this, the network determines whether the communications terminal has terminated the feedback mode at step 204. A communication terminal may terminate the feedback mode by entering a special code such as the pound (#) sign or by a given digital sequence. If the communication terminal has terminated the feedback mode, the process proceeds to step 210 where-no feedback response is provided and the network disconnects the retained portion of the network connection.

If, however, the communication terminal remains in the feedback mode, the process proceeds to optional step 206. At this step, the network may provide a prompt to the communication terminal as to what particular services feedback is solicited. Having done this, the process proceeds to step 208 where the network determines whether the communication terminal has provided a feedback response before the pre-determined period of time expires. If the communication unit has not, the process proceeds to step 210 where no feedback response is received and the network disconnects the retained portion of the network connection.

If, however, the communication terminal has provided feedback, the process proceeds to step 212 wherein the network stores the feedback response.

Figure 9:
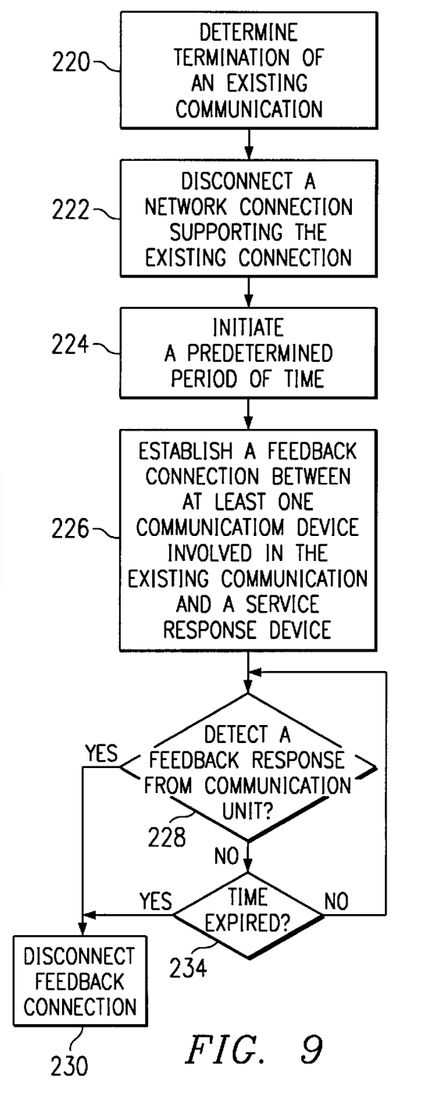
FIG. 9 illustrates yet another alternative logic diagram that may be used to implement the present invention.

FIG. 9 illustrates yet another alternative logic diagram for obtaining feedback responses from operators of communication terminals as to their perceived quality of network services. The process begins at step 220 where a determination is made as to whether an existing communication has been terminated. If so, the process proceeds to step 222 where the network connection supporting the existing communication is disconnected. The process proceeds to step 224 where initiation of a pre-determined period of time is commenced. At step 226, a feedback connection between at least one communication terminal involved in the existing communication and a service response device is established. At that point, the network determines, at step 228, whether the communication device has provided a feedback response. If yes, the process proceeds to step 230 where the feedback connection is disconnected. If, however, the network has not detected a feedback response, the process proceeds to step 234 where the network determines whether the time has expired. If not, the process waits for either a feedback response to be received or for the time to expire. Once the time expires, the process proceeds to step 230.

The above text has described a method and apparatus for obtaining feedback from operators of communications devices such as wireline telephones, personal computers, wireless telephones, mobile telephones etc. as to their perceived quality of network services. With such a method and apparatus, a network service provider can obtain more information as to the quality of service it provides to its customers. This information can be obtained in real time on a call-by-call basis such that upcoming catastrophic service failures can be prevented as well as giving the network provider key distinguishing service capabilities over its competitors. Further, a network provider can bundle the feedback responses and sell them to other network providers or cross-license with other network providers to obtain additional information. Still further, the network provider may utilize the compiled data to obtain information regarding future planning, the quality of new services and features, obtain a profile of user behavior, determine which partnering exchange carriers offer better quality as perceived by the customer, obtain diagnostic information as to catastrophic failures as well as mild failures, obtain diagnostic information, improve overall service, and offer better internetworking, i.e. identify networking mismatches and poor engineering.

The above description has been made with particular emphasis on the embodiments of the invention illustrated in the drawings. Those of skill in the art, however, will recognize that above mentioned and other alternative configurations can be utilized in the practice of the present invention without departing from the spirit and scope of the present invention as defined in the following claims.

What is claimed is:

1. A program storage device that stores a service feedback program, wherein, when a processing unit executes the service feedback program, the processing unit facilitates telecommunications service feedback data compilations, the program storage device comprising:

first storage means for storing program instructions that, when executed by the processing unit, causes the processing unit to establish a communication via a network connection;

second storage means for storing program instructions that, when executed by the processing unit, causes the processing unit to retain at least a portion of the network connection at completion of the communication;

third storage means for storing program instructions that, when executed by the processing unit, causes the processing unit to await, for a given period of time, a feedback response from at least one participant in the communication;

fourth storage means for storing program instructions that, when executed by the processing unit, causes the processing unit to receive the feedback response via the retained portion of the network connection; and fifth storage means for storing program instructions that, when executed by the processing unit, causes the processing unit to compile the feedback data to interpret telecommunications network services.

2. A program storage device that stores a service feedback program, wherein, when a processing unit executes the service feedback program, the processing unit facilitates telecommunications service feedback data compilations, the program storage device comprising:

first storage means for storing program instructions that, when read by the processing unit, causes the processing unit to determine termination of an existing communication:

second storage means for storing program instructions that, when read by the processing unit, causes the processing unit to disconnect a network connection supporting the existing communication;

third storage means for storing program instructions that, when read by the processing unit, causes the processing unit to establish a feedback connection between at least one communications device involved in the existing communication and a service response device; and fourth storage means for storing program instructions that, when read by the processing unit, causes the processing unit to disconnect the feedback connection after a given period of time has elapsed.

3. A program storage device that stores a service feedback program, wherein, when a processing unit executes the service feedback program, the processing unit facilitates telecommunications service feedback data compilations, the program storage device comprising:

first storage location for storing program instructions that, when executed by the processing unit, causes the processing unit to establish a communication via a network connection;

second storage location for storing program instructions that, when executed by the processing unit, causes the processing unit to retain at least a portion of the network connection at completion of the communication;

third storage location for storing program instructions that, when executed by the processing unit, causes the processing unit to await, for a given period of time, a feedback response from at least one participant in the communication;

fourth storage location for storing program instructions that, when executed by the processing unit, causes the processing unit to receive the feedback response via the retained portion of the network connection; and fifth storage location for storing program instructions that, when executed by the processing unit, causes the processing unit to compile the feedback data to interpret telecommunications network services.

4. A program storage device that stores a service feedback program, wherein, when a processing unit executes the service feedback program, the processing unit facilitates telecommunications service feedback data compilations, the program storage device comprising:

first storage location for storing program instructions that, when read by the processing unit, causes the processing unit to determine termination of an existing communication:

second storage location for storing program instructions that, when read by the processing unit, causes the processing unit to disconnect a network connection supporting the existing communication;

third storage location for storing program instructions that, when read by the processing unit, causes the processing unit to establish a feedback connection between at least one communications device involved in the existing communication and a service response device; and fourth storage location for storing program instructions that, when read by the processing unit, causes the processing unit to disconnect the feedback connection after a given period of time has elapsed.

\* \* \* \* \*